Patented June 28, 1966

3,258,470
6β,19-OXIDO-4-OXA-5α-ANDROSTAN-3-ONES

Alexander D. Cross, Mexico City, Mexico, assignor to Syntex Corporation, Panama, Panama, a corporation of Panama
No Drawing. Filed Mar. 19, 1964, Ser. No. 353,258
17 Claims. (Cl. 260—343.2)

The present invention relates to novel cyclopentanophenanthrene derivatives and to a process for the production thereof.

More particularly the present invention relates to novel 6β,19-oxido-4-oxa-5α-androstan-17β-ol-3-one derivatives.

The novel compounds of the present invention are represented by the following formula:

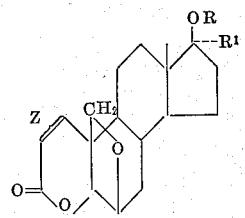

In the above formula R represents hydrogen or a hydrocarbon carboxylic acyl group of less than 12 carbon atoms; $R^1$ may be hydrogen, lower alkyl, lower alkenyl or lower alkinyl; and Z represents a saturated linkage or double bond, each between C-1 and C-2.

The acyl group is derived from hydrocarbon carboxylic acids containing less than 12 carbon atoms which may be saturated or unsaturated, of straight, branched, cyclic or cyclic-aliphatic chain or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formulae are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland.

The novel compounds of the present invention are prepared by the process exemplified as follows:

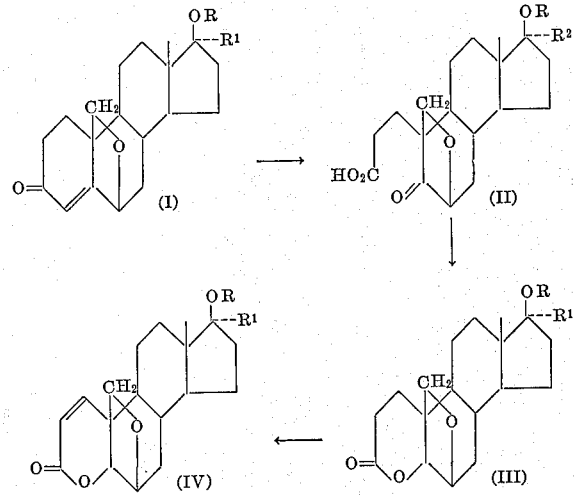

In the above formulae R and $R^1$ have the same meaning as described hereinbefore; and $R^2$ represents hydrogen, lower alkyl or lower alkinyl.

In practicing the process outlined above, the starting Compound I, which is a 6β,19-oxido testosterone derivative, is treated with ozone, preferably followed by hydrogen peroxide, to give the corresponding 6β,19-oxido-4-nor-3,5-seco-androstan-17β-ol-5-one-3-oic acid derivative (II). The latter compound, upon conventional reduction with sodium borohydride, gives the corresponding 6β,19-oxido-4-oxa-5α-androsten-17β-ol-3-one derivatives (III).

The 6β,19-oxido-4-oxa-5α-androsten-17β-ol-3-one compounds having a 17α-lower alkinyl substituent (III; $R^1$=lower alkinyl), are converted into the corresponding 17α-lower alkenyl derivative (III; $R^1$=lower alkenyl) by treatment with approximately 1 molar equivalent of hydrogen in the presence of a weak catalyst, such as 2% palladium on calcium carbonate.

The 6β,19-oxido-4-oxa-5α-androsten-17β-ol-3-one compounds (III) are treated with an excess of 2,3-dichloro-5,6-dicyano-1,4-benzoquinone in an inert solvent such as dioxane, for at least 48 hours and preferably not more than 10 days, at reflux temperature, to give the corresponding 6β,19-oxido-4-oxa-Δ¹-5α-androsten-17β-ol-3-one derivatives (IV).

The compounds of the present invention having a secondary hydroxyl group are conventionally acylated in pyridine with an acylating agent, such as an anhydride or a chloride of a hydrocarbon carboxylic acid of the type described hereinbefore, to give the corresponding acylates.

The compounds of the present invention having in the molecule a tertiary hydroxyl group, e.g., at C–17 are conventionally esterified in the presence of p-toluenesulfonic acid with an acylating agent, such as acetic anhydride, caproic anhydride, cyclopentylpropionic anhydride, or enanthic anhydride, to produce the corresponding esters.

The following specific examples serve to illustrate but are not intended to limit the scope of the present invention:

PREPARATION 1

A solution of 5g. of the acetate of 5α-bromo-6β,19-oxido-androstan-3β-ol-17-one (U.S. Pat. No. 3,065,228) in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α - methyl - 5α - bromo-6β,19-oxido-androstane-3β,17β-diol.

The above procedure was repeated except that methylmagnesium bromide was substituted by ethinylmagnesium bromide, thus giving: 17α-ethinyl-5α-bromo-6β,19-oxido-androstane-3β,17β-diol.

PREPARATION 2

A solution of 6 g. of 17α-methyl-5α-bromo-6β,19-oxido-androstane-3β,17β-diol in 120 cc. of pyridine was added to a mixture of 6 g. of chromic trioxide in 120 cc. of pyridine. The reaction mixture was kept at room temperature overnight. It was then diluted with ethyl acetate, filtered through Celite and the filtrate washed well with water, dried and evaporated to dryness. Crystallization from acetone-hexane afforded 17α-methyl-5α-bromo-6β,19-oxido-androstan-17β-ol-3-one.

1 g. of the latter steroid was dissolved in 20 cc. of methanol containing 0.2 g. of sodium hydroxide and the mixture was refluxed for 30 minutes, then poured into water and extracted with methylene chloride. Evaporation of the methylene chloride solution and crystallization of the residue from acetone-hexane yielded 17α-methyl-6β,19-oxido-Δ⁴-androsten-17β-ol-3-one.

17α - ethinyl-5α-bromo-6β,19-oxido-androstane-3β,17β-diol was treated by the above procedures, thus yielding 17α-ethinyl-6β,19-oxido-Δ⁴-androsten-17β-ol-3-one.

*Example I*

A solution of 5.2 g. of 6β,19-oxido-Δ⁴-androsten-17β-ol-3-one (Belg. Patent No. 606,182) in 50 cc. of glacial acetic acid and 50 cc. of ethyl acetate was placed in an ozonization tube, cooled in an ice-salt bath. A stream of ozone was introduced for 2 hours (0.024 mol per hour), then 20 cc. of water and 3 cc. of 30% hydrogen peroxide were added and the whole was stirred vigorously. The mixture was heated for half an hour on the steam bath and then kept at room temperature for 48 hours.

The resulting solution was concentrated to a small volume under reduced pressure on the steam bath, diluted with 20 cc. of methanol and poured into water. The mixture was extracted with ether, the extract washed with water, dried over anhydrous sodium sulfate and evaporated to dryness. The residue was chromatographed on 250 g. of alumina, thus yielding 6β,19-oxido-4-nor-3,5-seco-androstan-17β-ol-5-one-3-oic acid (Compound No. 1).

17α-methyl-6β,19-oxido-Δ⁴-androsten-17β-ol-3-one and 17α - ethinyl-6β,19-oxido-Δ⁴-androsten-17β-ol-3-one were treated by the same procedure, to give respectively: 17α-methyl - 6β,19 - oxido-4-nor-3,5-seco-androstan-17β-ol-5-one-3-oic acid (Cpd. No. 2) and 17α-ethinyl-6β,19-oxido-4 - nor-3,5-seco-androstan-17β-ol-5-one-3-oic acid (Cpd. No. 3).

*Example II*

A solution of 1 g. of sodium borohydride in 3 cc. of water was added to an ice-cooled solution of 1 g. of Compound No. 1 in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was chromatographed on alumina thus giving 6β,19-oxido-4-oxa-5α-androstan-17β-ol-3-one (Cpd. No. 4).

Compounds No. 2 and 3 were treated by the above procedure to give respectively: 17α-methyl-6β,19-oxido-4-oxa-5α-androstan-17β-ol-3-one (Cpd. No. 5) and 17α-ethinyl - 6β,19 - oxido - 4-oxa-5α-androstan-17β-ol-3-one (Cpd. No. 6).

*Example III*

A solution of 1 g. of Compound No. 6 in 40 cc. of pyridine was hydrogenated at 25° C. and 570 mm. in the presence of 400 mg. of pre-hydrogenated 2% palladium on calcium carbonate catalyst.

When 1.1 molar equivalent of hydrogen had been absorbed, the reaction was stopped, the catalyst separated by filtration through Celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 17α-vinyl-6β,19-oxido-4-oxa-5α-androstan-17β-ol-3-one (Cpd. No. 7).

*Example IV*

A mixture of 500 mg. of Compound No. 4, 10 cc. of dioxane and 350 mg. of 2,3-dichloro-5,6-dicyano-1,4-benzoquinone was refluxed for 50 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of alumina. Crystallization from acetone-hexane gave 6β,19-oxido-4-oxa-Δ¹-5α-androsten-17β-ol-3-one (Cpd. No. 8).

Compounds Nos. 5, 6, and 7 were treated by the same procedure to give respectively:
Cpd. No.:
9. 17α - methyl-6β,19-oxido-4-oxa-Δ¹-5α-androsten-17β-ol-3-one,
10. 17α - ethinyl-6β,19-oxido-4-oxa-Δ¹-5α-androsten-17β-ol-3-one,
11. 17α - vinyl - 6β,19-oxido-4-oxa-Δ¹-5α-androsten-17β-ol-3-one.

*Example V*

A mixture of 1 g. of Compound No. 4, 4 cc. of pyridine and 2 cc. of acetic anhydride was kept at room temperature overnight, poured into ice water, the formed precipitate was filtered, washed with water and dried. Crystallization from acetone-hexane gave 6β,19-oxido-4-oxa-5α-androstan-17β-ol-3-one acetate (Cpd. No. 12).

Compound No. 8 was treated by the above procedure to give 6β,19-oxido-4-oxa-Δ¹-5α-androsten-17β-ol-3-one acetate (Cpd. No. 13).

The starting compounds of Example V were treated following exactly the procedure described in that example, except that acetic anhydride was substituted by caproic anhydride, propionic anhydride, enanthic anhydride and cyclopentyl propionic anhydride thus affording respectively the corresponding caproates, propionates, enanthates and cyclopentyl propionates of said starting compounds.

*Example VII*

To a solution of 5 g. of Compound No.5 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α - methyl-6β,19-oxido-4-oxa-5α-androstan-17β-ol-3-one caproate (Cpd. No. 14).

The Compounds Nos. 6, 7, 9, 10, and 11 were treated by the preceding method to give respectively:
Cpd. No.:

15. 17α - ethinyl - 6β,19-oxido-4-oxa-5α-androstan-17β-ol-3-one caproate,
16. 17α - vinyl-6β,19-oxido-4-oxa-5α-androstan-17β-ol-3-one caproate,
17. 17α - methyl-6β,19-oxido-4-oxa-Δ¹-5α-androsten-17β-ol-3-one caproate,
18. 17α - ethinyl-6β,19-oxido-4-oxa-Δ¹-5α-androsten-17β-ol-3-one caproate,
19. 17α - vinyl - 6β,19-oxido-4-oxa-Δ¹-5α-androsten-17β-ol-3-one caproate.

*Example VIII*

The starting compounds of Example VII were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

I claim:
1. A compound of the following formula:

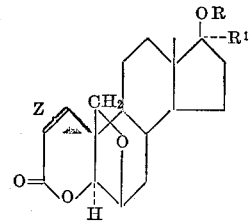

wherein R is selected from the group consisting of hydrogen and a hydrocarbon carboxylic acyl group of less than 12 carbon atoms; $R^1$ is a member selected from the group consisting of hydrogen, lower alkyl, lower alkenyl and lower alkinyl; and Z is selected from the group consisting of a saturated linkage and a double bond between C–1 and C–2.

2. 6β,19-oxido-4-oxa-5α-androstan-17β-ol-3-one.
3. 17α - methyl-6β,19-oxido-4-oxa-5α-androstan-17β-ol-3-one.
4. 17α - ethinyl-6β,19-oxido-4-oxa-5α-androstan-17β-ol-3-one.
5. 17α - vinyl-6β,19-oxido-4-oxa-5α-androstan-17β-ol-3-one.
6. 6β,19-oxido-4-oxa-$\Delta^1$-5α-androsten-17β-ol-3-one.
7. 17α - methyl-6β,19-oxido-4-oxa-$\Delta^1$-5α-androsten-17β-ol-3-one.
8. 17α - ethinyl - 6β,19-oxido-4-oxa-$\Delta^1$-5α-androsten-17β-ol-3-one.
9. 17α - vinyl-6β,19-oxido-4-oxa-$\Delta^1$-5α-androsten-17β-ol-3-one.
10. 6β,19 - oxido-4-oxa-5α-androstan-17β-ol-3-one acetate.
11. 17α - methyl-6β,19-oxido-4-oxa-5α-androstan-17β-ol-3-one caproate.
12. 17α - ethinyl-6β,19-oxido-4-oxa-5α-androstan-17β-ol-3-one caproate.
13. 17α - vinyl-6β,19-oxido-4-oxa-5α-androstan-17β-ol-3-one caproate.
14. 6β,19 - oxido-4-oxa-$\Delta^1$-5α-androsten-17β-ol-3-one acetate.
15. 17α - methyl - 6β,19-oxido-4-oxa-$\Delta^1$-5α-androsten-17β-ol-3-one caproate.
16. 17α - ethinyl - 6β,19-oxido-4-oxa-$\Delta^1$-5α-androsten-17β-ol-3-one caproate.
17. 17α - vinyl-6β,19-oxido-4-oxa-$\Delta^1$-5α-androsten-17β-ol-3-one caproate.

No references cited.

WALTER A. MODANCE, *Primary Examiner.*
JAMES A. PATTEN, *Assistant Examiner.*